(12) United States Patent
Martin et al.

(10) Patent No.: US 6,519,206 B1
(45) Date of Patent: Feb. 11, 2003

(54) SONIC DEVICE

(75) Inventors: William John Martin, 4 Derbyshire Road, Sale, Cheshire M33 4EG (GB); Vincent Lynch, Manchester (GB); Harold Convey, Bolton (GB)

(73) Assignee: William John Martin (GB)

( * ) Notice: Subject to any disclaimer, the term of this patent is extended or adjusted under 35 U.S.C. 154(b) by 0 days.

(21) Appl. No.: 09/743,012

(22) PCT Filed: Jun. 25, 1999

(86) PCT No.: PCT/GB99/02008
§ 371 (c)(1),
(2), (4) Date: Mar. 27, 2001

(87) PCT Pub. No.: WO00/00019
PCT Pub. Date: Jan. 6, 2000

(30) Foreign Application Priority Data

Jun. 29, 1998 (GB) ............................................. 9814040

(51) Int. Cl.⁷ ........................ A01K 15/02; A01M 29/02
(52) U.S. Cl. ..................................................... 367/139
(58) Field of Search ........................ 367/139; 119/859, 119/719; 340/384.2, 388.7, 397.3, 573.2, 573.3

(56) References Cited

U.S. PATENT DOCUMENTS 5,952,925 A * 9/1999 Secker ........................ 119/859

FOREIGN PATENT DOCUMENTS

| DE | 42 21 214 A | 1/1994 |
| EP | 0 265 182 A | 4/1988 |
| WO | WO 98 03057 | 1/1998 |

* cited by examiner

Primary Examiner—Daniel T. Pihulic
(74) Attorney, Agent, or Firm—Martine & Penilla, LLP

(57) ABSTRACT

A sonic device, adapted to be carried by a predatory animal is provided. The device emits a sonic signal either continuously or intermittently with a predetermined interval and duration. The device is controlled by a microprocessor (2) which is programmable to emit appropriate signals. The device may be temporarily deactivated by a location switch (12) when the predatory animal enters a defined location, such as a domestic environment, or by an optical switch when the ambient light intensity falls below a particular threshold level. The device includes a waterproof housing and a battery power source and may also include one or more solar panels.

25 Claims, 1 Drawing Sheet

SONIC DEVICE

Figure 1:
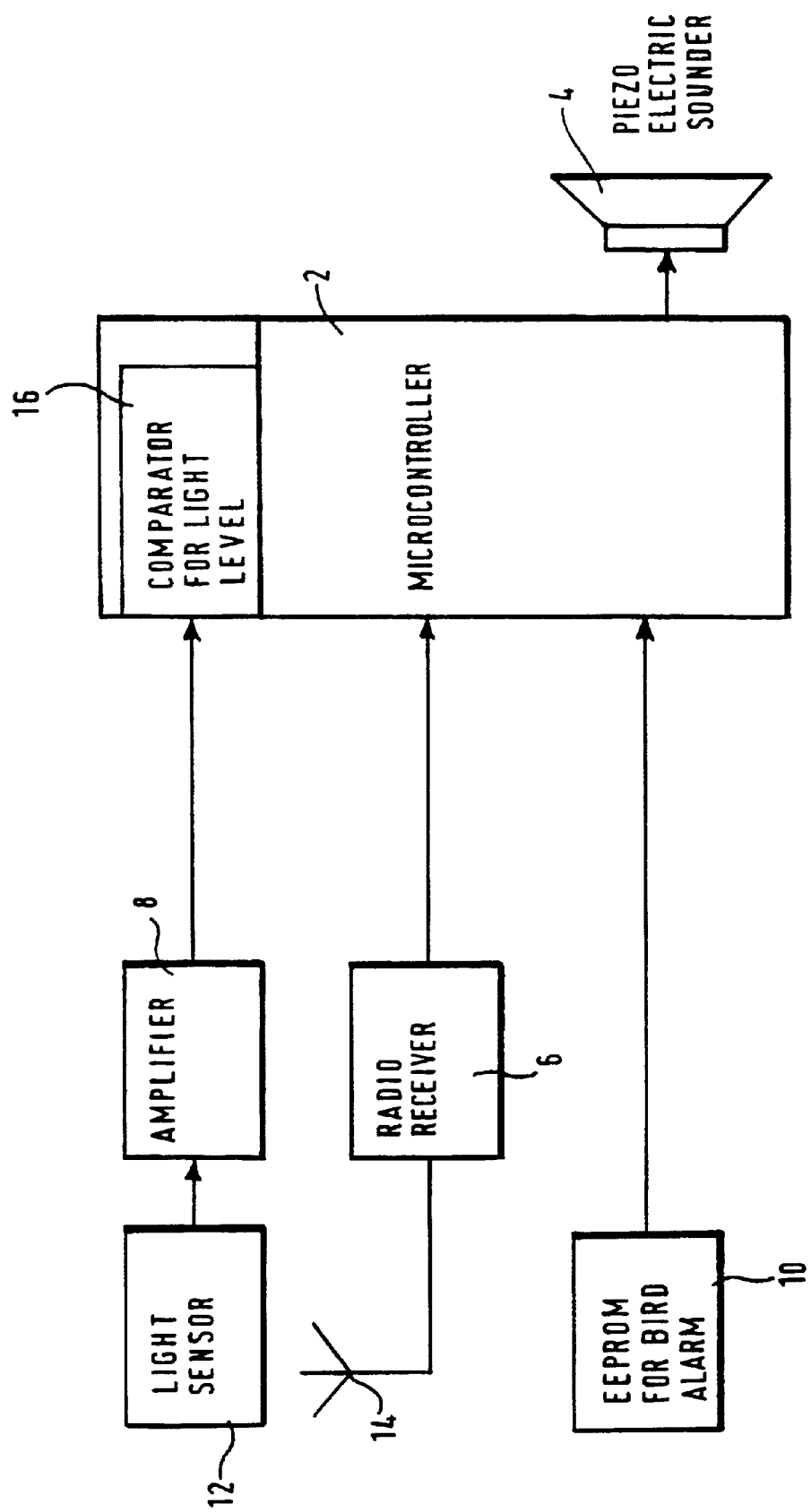

The present invention relates to an animal collar which includes a device to reduce predation by the subject animal by emitting a signal audible to its intended prey. In particular, the collar is intended to reduce predation by domestic cats.

Domestic cats are known to have a serious impact on bird populations. Worldwide, cats may have been involved in the extinction of more bird species than any other cause except habitat destruction and they are also contributing to the endangerment of populations of other rare small mammals. In Britain alone, domestic cats now number 7.2 million and are thought to kill at least 75 million birds annually. In Australia, the countries 21 million feral and domestic cats are believed to be responsible for killing 3 million animals per year including 67 native bird species and in the US, the 60 million domestic cats are estimated to kill more than 1.4 billion birds each year.

Although cats make affectionate pets, many domestic cats hunt as effectively as wild predators. However, domestic cats are thought to represent a greater problem than wild predators for the following reasons: Firstly, domestic casts are protected from disease, natural predation and competition, factors which control numbers of wild predators. Secondly, domestic cats have a dependable supply of food provided by humans and are, therefore, not influenced by changes in populations of prey. This means that cats can continue to hunt even rare species. Thirdly, unlike many native predators, cat densities are poorly limited or not limited at all by territoriality. Fourthly, unlike some predators, a cat's desire to hunt is not suppressed by having an adequate supply of supplemental food. Therefore, a cat's motivation to hunt remains strong even when fed regularly.

Despite being responsible for killing numerous birds and small animals, cats can also perform a useful function as companion pets. They also hunt pests and vermin which tend to feed at night, for example rats and mice.

It is therefore desired to reduce the number of bird and small animal deaths caused by cats during the day without reducing a cat's effectiveness in hunting and killing vermin and pests, such as rats and mice, which generally feed at night.

The following terms used herein are intended to be interpreted in the manner indicated below:

"subject animal" is an animal e.g. a domestic cat, carrying a device according to the present invention.

"audible" is used to mean capable of being heard by at least one species of prey of the subject animal. Sounds which are audible to certain animals or birds may be outside of the hearing range of human beings.

"Predation" is used to mean the killing of or injury to prey by the subject animal.

According to a first aspect of the invention there is provided a sonic device capable of being carried by a predatory animal, the device including means for emitting a sonic signal for alerting prey to the animal's presence.

The sonic signal may be intermittent or it may be continuous.

In embodiments where the sonic signal is intermittent, the delay between the emission of the intermittent sonic signals i.e. the periods when no signal is emitted, may be variable. Preferably the delay between emissions is between 0.5 and 600 seconds, more preferably between 1 and 60 seconds and most preferably between 5 and 10 seconds.

The duration of the emitted sonic signal i.e. the period when the signal is being emitted, may also be variable. The emitted sonic signal preferably lasts between 0.05 and 10000 milli-seconds, more preferably between 100 and 1000 milli-seconds and most preferably between 200 and 300 milli-seconds. The signal is preferably audible to a wide variety of potential prey of the subject animal. In a preferred embodiment the frequency of the emitted signal is between 300 and 8000 hertz. The device preferably includes means to vary the frequency of the emitted signal. More preferably, the device further includes means for generating a frequency modulated signal in which the frequency is continuously variable in a predetermined manner.

Embodiments of the invention in which the sonic signal is continuous may be useful for subject animals whose prey includes fast moving animals such as bats. In these situations, the sonic signal may be an ultrasonic signal i.e. a sonic signal having a frequency greater than about 20 kHz. For the purposes of this invention, the term "sonic signal" is intended to include signals having a frequency in the ultra-sound region (i.e. signals having a frequency greater than about 20 kHz).

The device is preferably carried by the animal via an attachment means, more preferably by a collar.

The device is preferably lightweight and more preferably small enough to be worn by the animal on eg. a collar without interfering with the animal's normal behaviour, other than its predatory behaviour.

Since the device may be worn permanently by the animal, it should preferably have a rugged construction capable of withstanding vibration and small impacts without impairing the performance of the device and more preferably it should be waterproof. By permanently it is meant either the lifetime of the animal or the lifetime of the device.

In a preferred embodiment, the device is housed in a housing. The housing may be constructed such that it is possible to obtain access to the device eg. the housing is a two-part construction wherein the two parts are releasably coupled to each other. Alternatively it may be constructed such that it is not possible to obtain access to the device without breaking the housing. That is to say the housing and device may be constructed as a disposable unit.

The device may be battery powered. The battery lifetime is preferably 1 year or more. In order to achieve this long lifetime the components of the device are preferably low power consumption components. To improve battery lifetime, the device may include one or more solar panels and a battery capable of being recharged by energy converted from solar energy by the or each of the solar panels.

The distance at which the signal is audible to a species of prey of the subject animal is preferably 3 meters or more.

The sonic signal may mimic an alarm or distress call of a particular species of prey. This type of signal is useful for protecting specific endangered or rare animals or birds which are at risk from attack by the subject animal. Alternatively, the sonic signal may be a complex synthesised sound. By this it is meant that the alarm or distress call is electronically generated. Where the signal is an alarm or distress call of a particular animal or bird, or a complex synthesised sound, it may be recorded and stored in the device, for example in a memory chip. The stored alarm or distress call or complex synthesised sound may be capable of being repeatedly emitted as the sonic signal of the device.

The emitted sonic signal preferably does not cause distress to the subject animal wearing the device or interfere with its normal behaviour, except of course its predatory behaviour.

In a preferred embodiment the subject animal is a domestic cat. Domestic cats spend part of their time within a domestic environment e.g. in its owner's home. To prevent the sonic signal of the device becoming a nuisance within the domestic environment, the device may be deactivated when the animal e.g. cat is within a predetermined area. To achieve this, the device preferably includes switching means which is capable of activating the device outside of the predetermined area and deactivating it when the animal is within the predetermined area.

The switching means may be operable as the animal passes through a predetermined opening of the domestic environment e.g. a cat flap. Such switching means may include a Hall Effect sensor within the device which is sensitive to a particular magnetic field generated in the proximity of the cat flap.

As an alternative to the switching means being operable as the animal e.g. a cat passes through a predetermined opening of the domestic environment e.g. a cat flap, the switching means may be sensitive to an inductive loop transmitter system wherein an inductive loop may be wired around the domestic environment and is driven electronically or simply by a loop amplifier powered e.g. by mains electrical supply.

A further alternative switching means includes an RF signal receiver responsive to RF signals transmitted from an RF transmitter located within the domestic environment. The device is deactivated when the RF receiver of the device carried by the animal comes within range of the RF signals transmitted by the transmitter and the device is activated when the RF receiver no longer receives the RF signals. The RF transmitter is preferably mains powered, but it could alternatively be battery powered, battery and mains powered, solar powered or powered by any other suitable means. The RF transmitter may be portable such that it may be connected to a suitable mains electrical supply within different predetermined areas. The transmitting range of the RF transmitter may be variable such that it can cover differently sized domestic environments.

A yet further alternative switching means includes an ultrasonic signal receiver responsive to ultrasonic signals such that the switching means may activate or deactivate the device in response to the received ultrasonic signals.

The RF receiver in the device may be modified so that it can receive radio broadcasts from an alternative or a second source, different to the RF transmitter which is in or near to the domestic environment. The RF signals broadcast by the second source are preferably capable of being converted into sonic signals emitted by the device. For example, a specific animal or bird distress or alarm call, or a series of these, may be broadcast as an RF signal by the second source and received by the RF receiver in the device. The received RF signal from the second source is then converted into the specific distress or alarm call, which is emitted by the device either in place of the predetermined sonic signal or in addition to the predetermined sonic signal. This modified device is particularly advantageous in situations where a specific rare animal or bird is introduced or reintroduced into an area e.g. a small island. The alarm or distress call of this animal or bird can be encoded in the form of an RF signal which is transmitted throughout the area, whereupon any predators in the area who are carrying a device according to this preferred embodiment of the invention will receive the broadcast. The device will then process the broadcasted RF signal and emit a sonic signal corresponding to that encoded in the RF transmission, thereby reducing predation by the subject animal of the specific animal or bird, whose alarm or distress call was encoded in the RF transmission. Alarm or distress calls of more than one animal or bird may be encoded and broadcast.

To enable the subject animals e.g. cats to continue to hunt pests and vermin at night, the device preferably includes an optical switch. This activates the device during daylight hours and deactivates it during the night. It is known that in bright sunlight the light intensity is about 20,000 lux. This falls to less than about 10 lux during the night. As such, the optical switch preferably deactivates the device when the light intensity level falls below a preselected threshold limit e.g. below about 100 lux. In a preferred embodiment, the optical switch deactivates the device when the light intensity level is about 10 lux or less. It may be possible to vary the preselected threshold limit.

In a preferred embodiment, the device is carried by the subject animal via attachment means e.g. a collar, which includes light emitting or reflecting markings to provide a visual warning of the subject animals presence in addition to the sonic warning emitted by the device. Since birds for example can detect light in the UV region of the electromagnetic spectrum, the markings preferably emit and/or reflect UV light.

The sonic emissions of the device may interfere with the natural interactions between two or more subject animals e.g. during mating. To overcome any such unwanted interference, the device may include a proximity sensor which is capable of temporarily deactivating the device when it detects another such device in close proximity to it. That is to say when two subject animals both of which are wearing sonic devices are in close proximity to each other, both of the devices may be temporarily deactivated.

A second aspect of the present invention provides a method of reducing predation by a subject animal, the method including fitting the subject animal with a device according to the first aspect of the invention. Preferably, the device is fitted via attachment means, more preferably via a collar.

A third aspect of the present invention provides use of a sonic device according to the first aspect of the invention to alert prey to the presence of a subject animal.

A fourth aspect of the invention provides an attachment means for wearing by an animal, the attachment means carrying a device according to the first aspect of the invention.

A fifth aspect of the invention provides an animal wearing a device according to the first aspect of the invention. Preferably the device is carried by an attachment means.

An embodiment of the present invention will now be described, by way of example only, with reference to the accompanying drawing in which:

FIG. 1 shows a schematic representation of a device of the present invention.

The device as represented in FIG. 1 is housed in a lightweight waterproof two piece plastic housing (not shown) which is a attached to a cat collar. It is controlled by a PIC 12C672 microcontroller 2 commercially available from Arizona Microchip (supplied by Microchip Technology Inc, Chandler, Ariz.). A light sensor 12 (optical switch part number BPX79 available from Plusopto) is connected via an amplifier 8 to the microcontroller 2. The microcontroller 2 includes an internal comparator 16 which compares an amplified input signal from the light sensor 12 with a predetermined threshold limit. The threshold limit is set to be equivalent to an ambient light level of 100 lux. When the light sensor detects an ambient light level intensity below 100 lux the microcontroller is placed in a sleep mode. The amplifier 8 is a commonly available electronic component. It is preferably a low power consumption amplifier. The light sensor arrangement allows for example the cat to hunt at night but reduces effective predation during the day. An RF receiver 6 is connected to the microcontroller 2 to determine whether or not the subject animal is within the domestic environment. The RF receiver 6 receives radio signals via an aerial 14 and converts the RF signals to electrical signals which are processed by the microcontroller 2. The RF signal is broadcast by an RF transmitting base station (not shown) connected to a mains electrical supply within a building. The RF signal is broadcast on a licence-free wavelength. The RF signal has an effective transmission range of about 25 to 30 meters within the building and has a diminishing range outside the building. The RF receiver 6 merely detects the presence of the RF transmission. That is to say it simply has a carrier detect function. Both the RF transmitting base station and RF receiver 6 are commonly available components and need not be described in detail herein. The sonic signal data is stored on an external 8 pin serial EEPROM device 10 connected to the microcontroller 2. The microcontroller 2 selectively energises a piezoelectric sounder 4 (a PCB buzzer, part number KU58N available from Maplin) to emit a 4 kHz sonic signal. A skilled person will appreciate that different sonic signals may be emitted in accordance with the data stored on the EEPROM device 10. If the data table for the sonic signal is small, the EEPROM device 10 may not be necessary and the data table for the sonic signal stored in a memory location or locations of the microcontroller 2.

The delay between emission of the sonic signals is 7 seconds and the signals have a duration of 250 milliseconds.

The device is powered by a 3 volt lithium battery (not shown) such batteries are commonly available, for example part No. P199 from Digikey which is a 255 milliamp hour battery.

The present invention has been disclosed above with reference to one presently preferred exemplary embodiment. However, the invention is not to be construed as being limited to that which has been specifically described and/or illustrated and various modifications may be made as will be apparent to the person skilled in the art without departing from the scope of the invention as will be defined in the claims.

What is claimed is:

1. A sonic device adapted to be carried by a predatory animal, the device including means for emitting a sonic signal for alerting prey to the animal's presence, characterized in that the device further includes a suspension means to suspend emission of the sonic signal when the device is within a predetermined area.

2. A sonic device according to claim 1 wherein the sonic signal is an intermittent signal.

3. A sonic device according to claim 2 wherein the delay between sonic signal emissions is 0.5 to 600 seconds.

4. A sonic device according to claim 3 wherein the duration of the sonic signal emission is 0.05 to 10000 milliseconds.

5. A sonic device according to claim 1 wherein the frequency of the emitted sonic signal is 300 to 8000 Hz.

6. A sonic device according to claim 1 wherein the device includes means to vary the frequency of the emitted sonic signal.

7. A sonic device according to claim 1 wherein the device includes means for generating a frequency modulated signal.

8. A sonic device according to claim 7 wherein the frequency is continuously variable in a predetermined manner.

9. A sonic device according to claim 1 wherein the device is carried by the animal via an attachment means.

10. A sonic device according to claim 9 wherein the attachment means is a collar adapted to be worn by the animal.

11. A sonic device according to claim 1 wherein the device is housed in a housing.

12. A sonic device according to claim 11 wherein the housing is waterproof.

13. A sonic device according to claim 11 wherein the housing is a two-part construction wherein the two parts are releasably coupled to each other.

14. A sonic device according to claim 11 wherein the housing is a one-piece construction whereby the device is formed as a disposable unit.

15. A sonic device according to claim 1 wherein the device is battery powered.

16. A sonic device according to claim 15 wherein the device further includes one or more solar panels and the battery is capable of being recharged by electrical energy converted from solar energy by the or each solar panel.

17. A sonic device according to claim 1 wherein the emitted sonic signal is an alarm or distress call of a predetermined species of prey.

18. A sonic device according to claim 1 wherein the emitted sonic signal is a complex synthesised sound.

19. A sonic device according to claim 1 wherein the device includes means for storing a recording of the sonic signal whereby the sonic signal is capable of being repeatedly emitted.

20. A method of reducing predation by a subject animal, the method including fitting the subject animal with a device according to claim 1.

21. A sonic device according to claim 1 wherein the suspension means includes a location switch capable of activating the device outside of the predetermined area and deactivating it when the device is within the predetermined area.

22. A sonic device according to claim 21 wherein the location switch includes an RF signal receiver and the predetermined area is defined by RF signals having a predetermined effective range transmitted by an RF transmitter, the RF signal receiver being responsive to the RF signals transmitted by the RF transmitter such that the device is deactivated when the RF receiver of the device comes within the effective range of the transmitted RF signals and the device is activated or reactivated when the RF receiver is no longer capable of detecting the transmitted RF signals.

23. A sonic device according to claim 1 wherein the device includes an optical switch.

24. A sonic device according to claim 23 wherein the optical switch deactivates the device when the light intensity is below a predetermined value and activates or reactivates the device when the light intensity is above the predetermined value.

25. A sonic device according to claim 24 wherein the predetermined light intensity value is 10 lux.

* * * * *